May 28, 1940.  N. J. SEIBERT ET AL  2,202,122
ROTARY TYPE FLUID METER
Filed Dec. 29, 1934  3 Sheets-Sheet 3
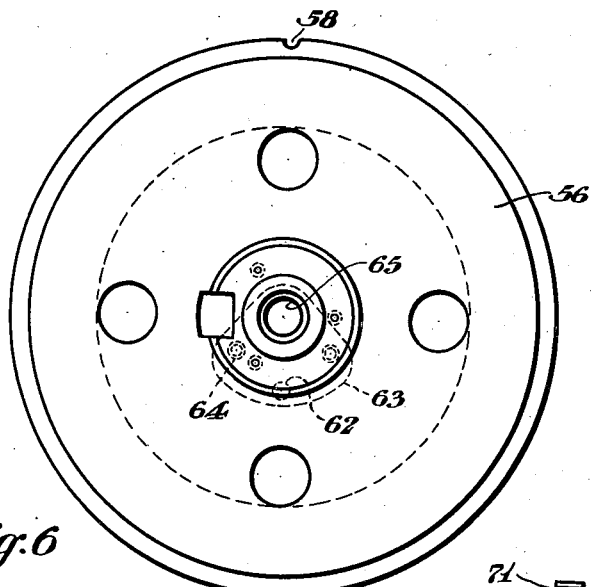
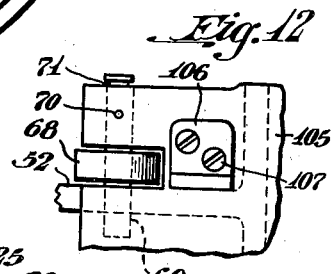
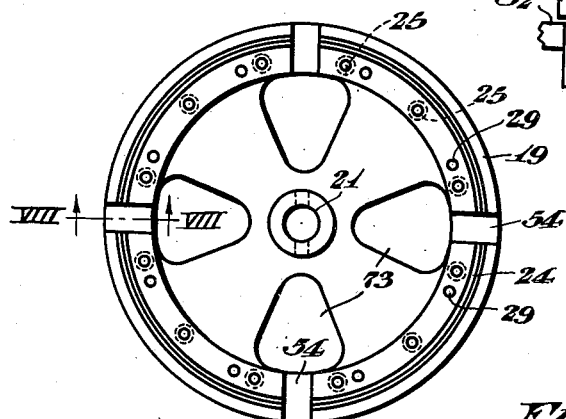
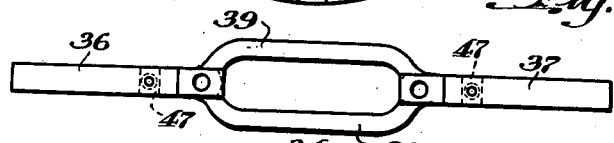
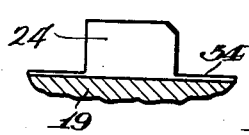
INVENTORS.
HORACE CHRISMAN
NELSON J. SEIBERT
BY
Strauch & Hoffman
ATTORNEYS Patented May 28, 1940

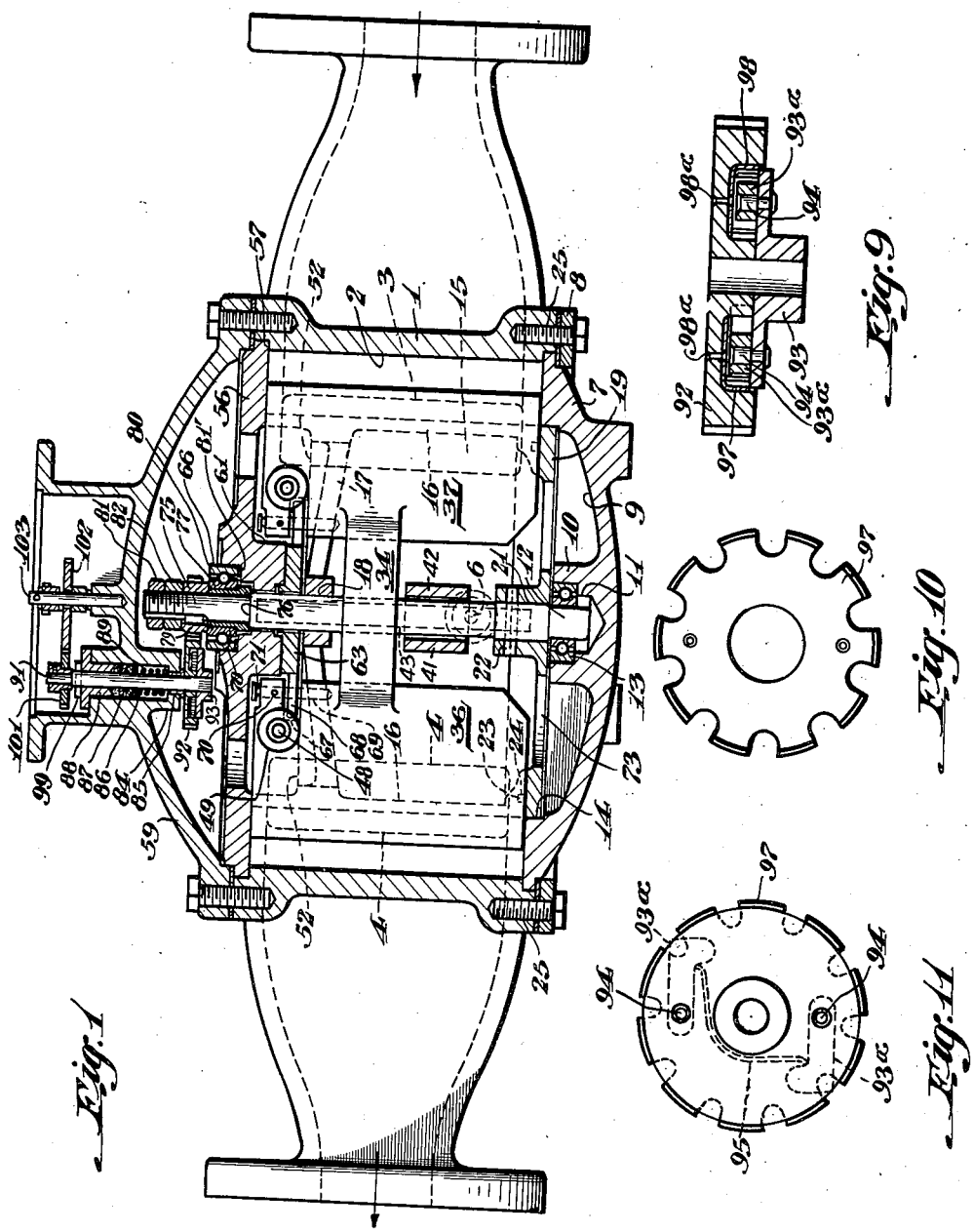

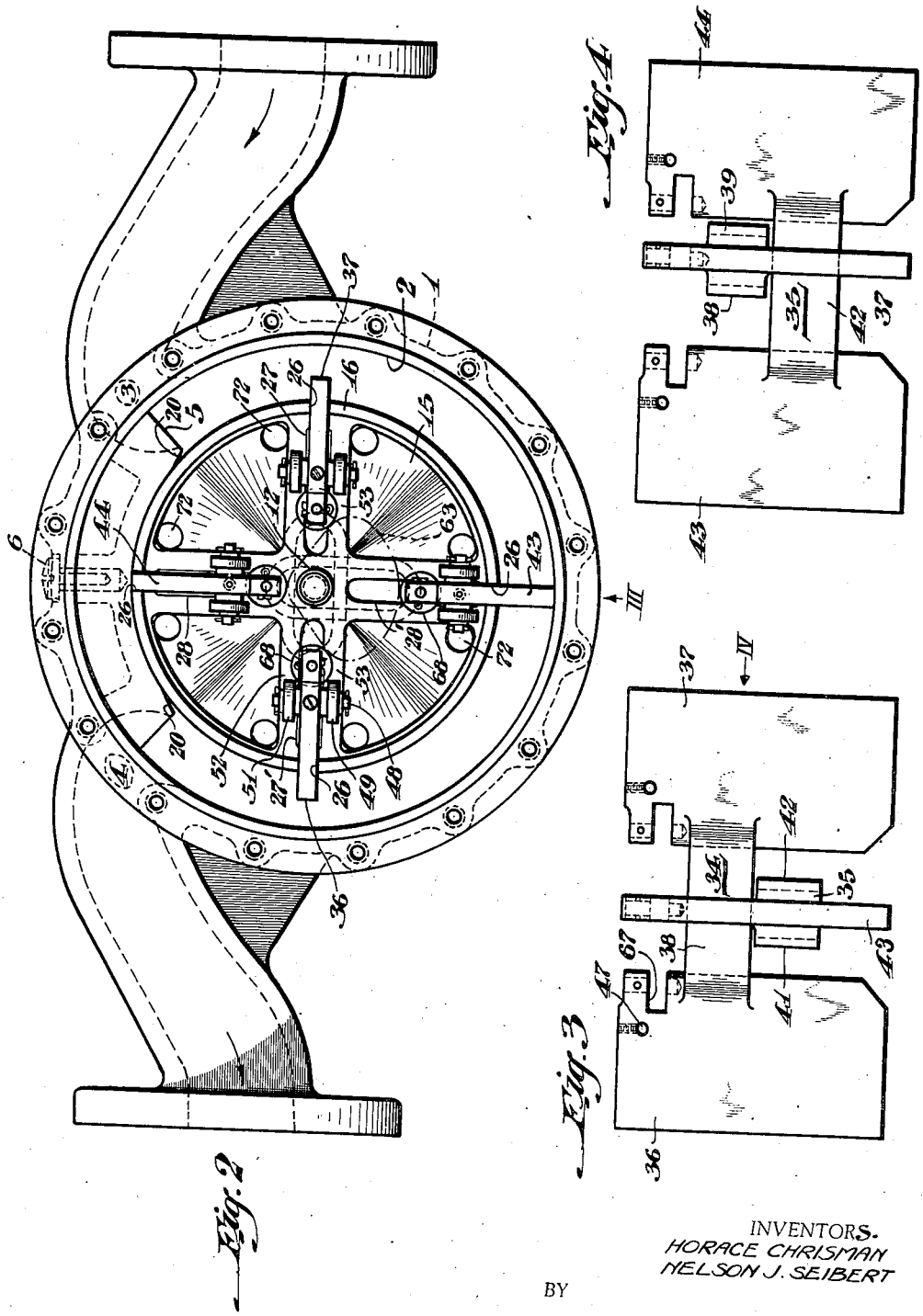

2,202,122

UNITED STATES PATENT OFFICE 2,202,122

ROTARY TYPE FLUID METER

Nelson J. Seibert, Wilkinsburg, and Horace Chrisman, Edgewood, Pa., assignors to Pittsburgh Equitable Meter Company, Pittsburgh, Pa., a corporation of Pennsylvania Application December 29, 1934, Serial No. 759,774

6 Claims. (Cl. 73—259)

This invention relates to fluid meters and more particularly to liquid meters of the rotary type.

In one known rotary type of meter the rotor carries a plurality of radially movable vanes operating in a chamber of general cylindrical shape, and means are provided for moving the vanes radially to successively form measuring chambers which are then opened into the outlet of the meter. As usually constructed this type of meter has the disadvantage of involving considerable friction in its operation, and therefore involves a rather high pressure loss between its inlet and outlet, and is not suitable for operation with low pressure heads. Heretofore it was thought necessary that the radially movable vanes must provide a contact approximating a friction fit with the walls of the measuring chamber to prevent inaccuracies of measurement, and this likewise has contributed to the difficulty of operation in this type of meter. It has also been considered necessary to rely upon the walls to move the vanes to their various positions which accordingly increases the friction incident to the operation of a meter.

According to the present invention a meter of this type is constructed with novel means for operating the movable vanes, provision being made for predetermined small clearances between the radially movable vanes and the measuring chamber walls whereby frictional resistance to turning is reduced. The fluid being measured may enter within this small clearance to lubricate and seal the relatively moving surfaces, and thereby further reduces frictional resistance to turning. The pressure difference between the inlet and outlet of the meter therefore is made so small by the reduction in friction losses, that only a negligible quantity of fluid to be measured will by-pass through these clearances. Consequently, the accuracy of the meter is not impaired.

Frictional resistance to turning of the meter is further eliminated in a novel manner by suspending the rotor and associated parts from the top cover of the meter on a rotatable shaft journalled in an antifriction bearing assembly. To further eliminate friction the radially movable vanes are mounted on suitable antifriction members so that they are free to move radially with the least amount of friction. Novel means is provided in the form of a cam for causing the blades to be moved radially in the operation of the meter, and the contacting surfaces between the blades and cam likewise consists of anti-friction rollers. The vanes are supported on the rotor which in turn is supported by the shaft. These supports preferably are located adjacent the top of the meter, and provision is made to prevent sediment or other foreign matter which accumulates in the meter from interfering with its operation. The rotor has its top surface inclined and perforated so that sediment that falls thereon will be carried outward by centrifugal force and down into the rotor chamber. Suitable perforations are provided in the bottom of the rotor to permit sediment to fall therethrough into a suitable depression or sump formed in the bottom cover. Since this type of meter is reversible in its operation, a one way ratchet drive is preferably provided so that reverse operation of the meter will not operate the register.

It is therefore an object of our invention to provide a novel rotary meter in which frictional resistance to turning is reduced to an unobjectionable minimum and which has a low over all pressure loss.

A further object is to provide a novel rotary meter in which a predetermined clearance is provided between the rotor elements and casing to reduce frictional resistance to turning and to eliminate wear or need for adjustment.

Still a further object of our invention is the provision of a novel rotary meter in which the rotor and its associated parts are suspended in a novel manner from the top of the meter, novel means being provided to regulate the clearances between the rotor and the casing.

These and other objects will be apparent from a consideration of the following specification taken in connection with the accompanying drawings and wherein:

Figure 1 is a view partially in section of a preferred embodiment of the invention;

Figure 2 is a top plan view of the meter with the covers removed;

Figure 3 is a side elevation of the sets of vanes looking in the direction of the arrow III of Figure 2;

Figure 4 is an elevation showing the sets of vanes looking in the direction of the arrow IV of Figure 3;

Figure 5 is a top plan view of one of the vanes;

Figure 6 is an elevation of the measuring chamber cover;

Figure 7 is a plan view of the rotor bottom plate;

Figure 8 is a fragmentary section taken on line VIII—VIII of Figure 7 on a greatly enlarged scale;

Figure 9 is an assembled view showing the one way ratchet drive;

Figure 10 is a bottom elevation of the ratchet disk;

Figure 11 is a bottom elevation of the pawl plate in assembled position;

Figure 12 is a fragmentary view of a further preferred type of vane showing sliding contacts.

Referring to the drawings, Figure 1, the meter comprises an outer casing 1 having a cylindrical chamber 2 formed therein, and inlet and outlet connections 3 and 4 respectively communicating with said chamber. A division plate 5 (Figure 2) is secured within the chamber 2 between the inlet and outlet openings by suitable means such as cap screws 6, the two sides thereof being concentrically arcuate, and has its ends chamfered as indicated at 20. The bottom of the casing has a rabbet and is closed by a bottom plate 7 bolted or otherwise secured thereto, as by a retaining ring 8. The bottom plate or cover 7 is depressed as indicated at 9 to provide a sump, and a boss 10 at the center of depression 9 is bored out at 11 to receive a shaft 12 and is counterbored to receive a radial thrust ball bearing assembly 13 through which the shaft extends. The bottom plate 7 is machined at 14 with a cylindrical face to receive a hollow and preferably cylindrical rotor 15.

The rotor 15 comprises an outer cylinder wall 16 and a cylinder head 17 which is bored at 18 to receive the shaft 12 extending vertically therethrough. The bottom of the rotor is closed by a bottom plate 19 (Figures 1 and 7) having a central hub which is bored at 21 to receive the shaft 12, and is keyed by the pin 22 or in any other suitable manner thereto. The lower end of the cylindrical wall 16 is thickened and has a circumferential recess 23 therein which receives a corresponding circumferential rib 24 of the bottom plate 19, and the bottom plate is held to the rotor by suitable screws or bolts passing through the holes 25. The cylinder wall 16 has four slots 26 (Figure 2) formed therein which are extended radially through the head 17 and relieved as indicated at 27, 27' and 28, 28', terminating short of the central bore 18 to provide a suitable thickness of metal. The rib 24 is accurately machined on its inner circumferential wall and accurately registers with the inner circumferential wall of depression or recess 23. In order to hold the four segments of the rotor 15 accurately positioned the bottom plate 19 is bored in assembled position as indicated at 29 and suitable dowel pins are inserted therethrough into the cylinder wall 16. The central portion of metal around the bore 18 and the bottom plate 19 thus rigidly hold the four rotor segments in position.

A plurality of radially movable interconnected vanes 34 and 35 are received in the rotor. As seen in Figures 3, 4 and 5, the vane 34 comprises two flat end blades 36 and 37 interconnected by two integral webs 38 and 39 leaving a sufficient longitudinal space therebetween to freely receive the shaft 12. As the vanes 34 and 35 differ only in that the pair of webs 41 and 42 connecting the two end blades 43 and 44 of vane 35 are offset from the pair of webs 38 and 39, only vane 34 will be described in detail.

The vanes 34 and 35 are inserted in slots 27, 27', 28 and 28' and extend through the slots 26 in the cylindrical wall 16 of the rotor into the chamber 2. The blade 36 is bored horizontally at 47 to receive a pin 48 held in place by a set screw, and on the outer ends thereof are journalled a pair of rollers 49 and 51 held in place by suitable spacers and cotter pins or any other suitable means. Blade 37 is constructed exactly like blade 36. The cylinder head 17 is machined to provide a pair of horizontal tracks 52 and 53 adjacent each of the radial slots 27, 27', 28 and 28' and the rollers 49 and 51 rest on these tracks and support the vanes. At the bottom of the rotor the bottom plate 19 has the grooves 54 cut therein slightly below the machined face of the plate to receive the vanes.

The chamber 2 is closed by a top chamber cover plate 56 (Figure 1) which rests on an internal step 57 around the casing and is positioned by a semi-circular groove 58 (Figure 6) at its outer periphery cooperating with a suitable dowel in the casing. The meter cover 59 retains the plate 56 in position. The plate 56 has a depending central lug 61 bored eccentrically at 62, and a cam 63 is held in place by suitable screws 64, the hole 62 receiving a dowel to properly locate this cam. The plate has a hole 65 through which extends the shaft 12, and is counterbored to receive a combined radial and end thrust ball bearing assembly 66.

The blade 36 has a laterally cut out portion 67 to receive a roller 68 which is freely journalled on vertical pin 69, the pin being keyed in place by a pin 70, a circumferential groove 71 being formed in the periphery of pin 69 at its upper end to facilitate removal thereof. As shown in Figure 1, cam 63, carried by cover plate 56, is substantially in the plane passing through the axes of rollers 49 and 51. Thus the tendency of the operating cam 63 to tilt or turn the blades 43 and 44 is very materially reduced. It will also be observed that tracks 52 and 53 are located near to the top of the rotor so that the vanes 34 and 35 may hang therefrom, on rollers 49 and 51, in a very stable manner.

The major portion of the cylinder head 17 is slightly depressed below the level of the tracks 52 and 53 and is inclined from the center outwardly to the holes 72 formed adjacent the cylindrical wall 16. Any foreign matter that falls on this cylinder head will be thrown outwardly by centrifugal force and will drop through these holes into the interior of the rotor. The bottom plate 19 of the rotor has a plurality of apertures indicated at 73 to permit sediment to fall through into the sump 9 provided in the bottom casing cover 7 so that foreign matter will not interfere with the operation of the meter.

The shaft 12 which rotates with the rotor, has a reduced portion 75 forming a shoulder 76, and a flanged bushing 77 is located thereon to rotate with the shaft and is pressed into the inner race 78 of the ball bearing assembly 66. A gear 79 keyed to this shaft is held in place by a pair of locking nuts 81, 82 against bushing 77 which in turn is held against the shoulder 76, and the outer race 80 is supported on a shim 81' whereby the vertical spacing of the rotor in the chamber can be adjusted. The cover 59 has a thickened portion 84 which is bored to receive a bushing 85 and is counterbored at 86 to form a packing recess in which is located the packing 87 held between a gland 88 and a spring 89. A driven shaft 91 extends through the gland 88 and bushing 85 and at its lower end has a gear 92 loosely journalled thereon. A ratchet plate 93 is pressed onto the end of shaft 91 and carries the two pawls 93a pivoted on pins 94 and urged outwardly by a leaf spring 95. These pawls cooperate with a dished ratchet disk 97 located in a depression 98 of the gear 92 which is pinned thereto by swaged pins 98a. A spacing washer 99 is located at the top of shaft 91 and a gear 101 suitably secured to the shaft drives a gear 102 on a shaft 103 which is suitably connected to operate the register.

In operation liquid enters the measuring chamber 2 through the inlet 3 and is directed substantially tangentially against the blades. The pressure and velocity of the incoming liquid drive the blades around the chamber 2 which causes rotation of the rotor 15. The cam 63 reacting on the rollers 68 is of such shape that for a 90° turn of the rotor the blades 36 and 37 are moved radially in unison to the position occupied by the blades 43 and 44 as shown in Figure 2. As the meter continues to operate, liquid is trapped in the compartments of chamber 2 formed between the blades and is carried around and out at the tangentially directed outlet 4. The rotary movement of cylinder 15 is transmitted through the shaft 12 and gear 79 to gear 92 which idles on shaft 91. However, when driven in one direction the ratchet disk 97 engages the pawls 93a to drive the shaft 91.

The cam 63 is shaped so that there is always a predetermined small clearance on the order of .001 to .002 inch between the blade ends and the wall of chamber 2 and the fluid being measured gets into this clearance to act as a lubricant and liquid seal and reduces friction. Also, it will be noted that the vanes rest entirely on the pairs of rollers 49 and 51, and contact with the cam 63 through rollers thereby further eliminating friction. The whole weight of shaft 12, and rotor 15 with its vanes 34 and 35 and associated parts is carried by the ball bearing assembly 66 on the top plate 56 thereby further reducing friction. The rollers and other bearings are all mounted at the top where sediment is least likely to accumulate and interfere with the operation of the meter. The construction shown provides a meter which offers very little resistance to flow therethrough and may be employed for measuring liquid at a low pressure head.

In the modification shown in Figure 12, the vanes rest on slides instead of rollers, but otherwise are the same. The blade 105 has a slide 106 on each face thereof secured thereto by screws 107, and the slides rest on the tracks 52 and 53. The operation of this modification is the same as that previously described, the slides serving to support the vanes and reduce friction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter; a casing having a measuring chamber; a top cover member for said chamber; a bottom cover member for said chamber; radial bearing means in said bottom cover member; combined radial and axial thrust anti-friction bearing means supported in said top cover and including an inner race; a vertical shaft extending through said chamber, said shaft being journalled in said radial bearing and secured to said inner race so as to be journalled in, and supported by, said anti-friction bearing means; a rotor secured to, and suspended by, said shaft within said chamber, said rotor being provided with track means; a relatively fixed cam; and radially movable vanes carried by said rotor and cooperating with said cam to be moved radially thereby, said vanes being provided with rollers engaging said track means, whereby said rotor and vanes are suspended from said top cover member in predetermined spaced relation to said covers.

2. In a fluid meter, a top cover, a vertical shaft journalled in and supported by said cover, a rotor carried by said shaft and having a plurality of slots therein, a plurality of vanes in said slots, a plurality of tracks on said rotor adjacent said slots and the top thereof, and friction reducing means associated with said vanes for support thereof on said tracks.

3. In a fluid meter, a top cover, a vertical shaft journalled in and supported by said cover, a rotor carried by said shaft and having a plurality of slots therein, a plurality of vanes in said slots, a plurality of tracks on the rotor adjacent said slots and near the top thereof, and rollers journalled in said vanes and operating on said tracks to support said vanes.

4. In a fluid meter, a top cover, a vertical shaft journalled in and supported by said cover, a rotor carried by said shaft and having a plurality of slots therein, a plurality of vanes in said slots, a plurality of tracks on said rotor adjacent said slots and the top thereof, and slides associated with said vanes for support thereof on said tracks.

5. In a fluid meter, a casing providing a cylindrical bore; a substantially cylindrical rotor in said bore providing a substantially annular measuring chamber therewith; a bottom cover for said casing closing the end of said bore and providing one confining wall of said measuring chamber; a top cover for the bore spanning said rotor and casing and providing a confining wall of the measuring chamber; combined radial and axial thrust anti-friction bearing means comprising inner and outer race members adjustably mounted in said top cover; radial bearing means in said bottom cover; a vertical shaft extending through said bore, said shaft being journalled in said radial bearing and secured to said inner race so as to be journalled in, and adjustably supported by, said anti-friction bearing means; said shaft being secured to, and supporting said rotor in predetermined spaced relation with respect to said covers, and radially movable pairs of vanes carried by said rotor, said vanes being supported on said rotor in definite spaced relation to said covers by rollers carried by said vanes and engaging said rotor; and a cam on said top cover for moving said vanes into and out of said measuring chamber as the rotor rotates.

6. In a fluid meter, a casing providing a cylindrical bore, a substantially cylindrical rotor in said bore providing a substantially annular measuring chamber therewith, a bottom cover for said casing closing the end of said bore and providing one confining wall of said measuring chamber, a top cover for the bore spanning the rotor and casing and providing a confining wall of the measuring chamber, a vertical shaft rotatably journaled in and supported by said top cover, said shaft supporting said rotor in predetermined spaced relation with respect to said covers, said rotor having a top head and a plurality of radial slots therein, tracks on the rotor head adjacent said slots and close to the top of said head, a plurality of radially movable pairs of vanes in said slots having rollers adjacent their upper edges supported by said tracks, a cam on said top cover for moving said vanes into and out of the measuring chamber as the rotor rotates to seal off portions thereof, said cam being arranged substantially in line with said rollers.

HORACE CHRISMAN.
NELSON J. SEIBERT.